United States Patent
Wu et al.

(10) Patent No.: US 11,748,619 B2
(45) Date of Patent: Sep. 5, 2023

(54) IMAGE FEATURE LEARNING DEVICE, IMAGE FEATURE LEARNING METHOD, IMAGE FEATURE EXTRACTION DEVICE, IMAGE FEATURE EXTRACTION METHOD, AND PROGRAM

(71) Applicant: NIPPON TELEGRAPH AND TELEPHONE CORPORATION, Tokyo (JP)

(72) Inventors: Xiaomeng Wu, Tokyo (JP); Go Irie, Tokyo (JP); Kaoru Hiramatsu, Tokyo (JP); Kunio Kashino, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 345 days.

(21) Appl. No.: 17/251,686

(22) PCT Filed: Jun. 14, 2019

(86) PCT No.: PCT/JP2019/023757
§ 371 (c)(1),
(2) Date: Dec. 11, 2020

(87) PCT Pub. No.: WO2019/240281
PCT Pub. Date: Dec. 19, 2019

(65) Prior Publication Data
US 2021/0256290 A1   Aug. 19, 2021

(30) Foreign Application Priority Data
Jun. 15, 2018   (JP) ................................ 2018-114318

(51) Int. Cl.
*G06N 3/08* (2023.01)
*G06F 18/214* (2023.01)
(Continued)

(52) U.S. Cl.
CPC ............. *G06N 3/08* (2013.01); *G06F 18/214* (2023.01); *G06F 18/2413* (2023.01);
(Continued)

(58) Field of Classification Search
None
See application file for complete search history.

(56) References Cited

U.S. PATENT DOCUMENTS

2017/0220904 A1* 8/2017 Bai ...................... G06V 10/764
2018/0144209 A1* 5/2018 Kim ................. G06F 18/24143

OTHER PUBLICATIONS

Babenko et al. (2014) "Neural Codes for Image Retrieval" European Conference on Computer Vision (ECCV), Zurich, pp. 584-599.
(Continued)

*Primary Examiner* — Leon Flores

(57) ABSTRACT

The purpose of the present invention is to enable learning of a neural network for extracting features of images having high robustness from an undiscriminating image region while minimizing the number of parameters of a pooling layer. A parameter learning unit 130 learns parameters of each layer in a convolutional neural network configured by including a fully convolutional layer for performing convolution of an input image to output a feature tensor of the input image, a weighting matrix estimation layer for estimating a weighting matrix indicating a weighting of each element of the feature tensor, and a pooling layer for extracting a feature vector of the input image based on the feature tensor and the weighting matrix. The parameter learning unit 130 learns the parameters such that a loss function value obtained by calculating a loss function expressed by using a distance between a first feature vector of a first image and a second feature vector of a second image, which are relevant images and are obtained by applying the convolutional neural network, becomes smaller.

20 Claims, 12 Drawing Sheets

(51) Int. Cl.
*G06F 18/2413* (2023.01)
*G06V 10/764* (2022.01)
*G06V 10/774* (2022.01)
*G06V 10/82* (2022.01)

(52) U.S. Cl.
CPC .......... *G06V 10/764* (2022.01); *G06V 10/774* (2022.01); *G06V 10/82* (2022.01)

(56) References Cited

OTHER PUBLICATIONS

Babenko et al. (2015) "Aggregating Deep Convolutional Features for Image Retrieval" IEEE International Conference on Computer Vision (ICCV), Santiago de Chile, pp. 1269-1277.
Radenovic et al. (2016) "CNN Image Retrieval Learns from BoW:Unsupervised Fine-Tuning with Hard Examples" European Conference on Computer Vision (ECCV), pp. 3-20.

* cited by examiner

Fig. 6

| | MAPs obtained with different initializations. | | |
|---|---|---|---|
| | Initial $p$ | Oxford5K | Paris6K |
| GeM | 3 | 87.8 | 92.7 |
| PRESENT EMBODIMENT | 2 | 88.6 | 92.2 |
| | 3 | 88.9 | 92.3 |
| | 4 | 88.8 | 92.5 |
| | 5 | 88.4 | 92.6 |

Fig. 7

MAP comparison with state-of-the-art image retrieval based on deep networks. Our method is marked with *, in which $p$ is initialized by 4. The updated state-of-the-art results are highlighted in bold.

| | CNN | Fine-tuned | QE | Oxford5K | Oxford105K | Paris6K |
|---|---|---|---|---|---|---|
| SPoC | VGG | ✗ | ✗ | 56.4 | 47.8 | 72.3 |
| CroW | VGG | ✗ | ✗ | 70.8 | 65.3 | 79.7 |
| BoW-CNN | VGG | ✗ | ✗ | 73.9 | 59.3 | 82.0 |
| NetVLAD | VGG | ✓ | ✗ | 71.6 | – | 79.7 |
| MAC | VGG | ✓ | ✗ | 80.0 | 75.1 | 82.9 |
| Fisher Vector | VGG | ✓ | ✗ | 81.5 | 76.6 | 82.4 |
| R-MAC | ResNet | ✓ | ✗ | 86.1 | 82.8 | 94.5 |
| GeM | ResNet | ✓ | ✗ | 87.8 | 84.6 | 92.7 |
| * PRESENT EMBODIMENT | ResNet | ✓ | ✗ | 88.8 | 85.6 | 92.5 |
| CroW+QE | VGG | ✗ | ✓ | 74.9 | 70.6 | 84.8 |
| BoW-CNN+QE | VGG | ✗ | ✓ | 78.8 | 65.1 | 84.8 |
| MAC+QE | VGG | ✓ | ✓ | 85.4 | 82.3 | 87.0 |
| R-MAC+QE | ResNet | ✓ | ✓ | 90.6 | 89.4 | 96.0 |
| GeM+αQE | ResNet | ✓ | ✓ | 91.0 | 89.5 | 95.5 |
| * PRESENT EMBODIMENT+QE | ResNet | ✓ | ✓ | 91.7 | 89.7 | 96.0 |

-- PRIOR ART --

IMAGE FEATURE LEARNING DEVICE, IMAGE FEATURE LEARNING METHOD, IMAGE FEATURE EXTRACTION DEVICE, IMAGE FEATURE EXTRACTION METHOD, AND PROGRAM

CROSS-REFERENCE TO RELATED APPLICATIONS

This application is a U.S. 371 Application of International Patent Application No. PCT/JP2019/023757, filed on 14 Jun. 2019, which application claims priority to and the benefit of JP Application No. 2018-114318, filed on 15 Jun. 2018, the disclosures of which are hereby incorporated herein by reference in their entireties.

TECHNICAL FIELD

The present invention relates to an image feature learning device, an image feature learning method, an image feature extraction device, an image feature extraction method, and a program, and more particularly, to an image feature learning device, an image feature learning method, an image feature extraction device, an image feature extraction method, and a program for extracting features of images.

BACKGROUND ART

Image feature extraction is a kind of dimensionality reduction that efficiently represents parts of the image of interest as compact feature vectors. This method is useful when the image size is large and concise feature representation is needed to quickly perform tasks such as image recognition, matching, and search.

In recent years, image feature extraction based on deep learning has attracted a lot of attention. Prior to deep learning, image feature extractors were designed by human experts by trial and error.

In deep learning, a convolutional neural network (CNN) can be used as an image feature extractor, which can be learned from data.

FIG. 12 illustrates an example of a CNN structure used for image feature learning. This is the structure often used when the task is image matching and search.

In learning, a set of two images and a label indicating whether the images are relevant images are input as training data, and a loss function value is output. A large number of pieces of training data are given, and the loss function value is minimized to learn parameters of the CNN.

The CNN includes a fully convolutional layer, a pooling layer, and a loss function value calculation layer. The fully convolutional layer inputs an image, and outputs a three-dimensional feature tensor. The three dimensions are composed of the first and second dimensions corresponding to the height and the width of the input image, and the third dimension corresponding to the number of channels of the feature tensor.

The pooling layer inputs the feature tensor, and outputs a one-dimensional feature vector. The loss function value calculation layer inputs two feature vectors extracted from the two images and the label, and outputs a loss function value.

When a learned CNN is used as an image feature extractor, one image is input, and a feature vector as an output of the pooling layer is extracted and used for image matching and search of images.

In order to achieve better performance in CNN-based image feature learning, it is important to design a pooling layer that fits the data well.

In NPL 1, a fully connected layer, which is commonly used in CNNs, is used as a pooling layer.

In NPL 2, the pooling layer acts on the first and second dimensions corresponding to the height and width of the input image in the three dimensions of the feature tensor, and calculates the feature vector by calculating the sum of elements of the feature tensor along the two dimensions. In this case, the elements are treated as vectors. The sizes of the two dimensions in which the pooling layer acts on are all 1, and the remaining one-dimensional size remains unchanged.

In a method in NPL 3, the pooling layer calculates the feature vector by replacing the sum of elements of the feature tensor with the largest element of the feature tensor.

CITATION LIST

Non Patent Literature

[NPL 1] Artem Babenko, Anton Slesarev, Alexander Chigorin, and Victor S. Lempitsky, Neural codes for image retrieval, In ECCV, 2014, pp. 584-599.
[NPL 2] Artem Babenko and Victor S. Lempitsky, Aggregating local deep features for image retrieval, In ICCV, 2015, pp. 1269-1277.
[NPL 3] Filip Radenovic, Giorgos Tolias, and Ondrej Chum, "CNN image retrieval learns from BoW: Unsupervised fine-tuning with hard examples," in ECCV, 2016, pp. 3-20.

SUMMARY OF THE INVENTION

Technical Problem

The method in NPL 1, however, has a problem in that the number of parameters of a pooling layer is enormous and it is difficult to optimize the parameters.

The methods in NPL 2 and 3 treat the elements of the feature tensor along the first and second dimensions corresponding to the height and the width of the input image equally, and hence have a problem in that the performance of image feature learning is adversely affected by an undiscriminating image region.

The present invention has been made in view of the above, and it is an object thereof to provide an image feature learning device, an image feature learning method, and a program capable of learning a neural network for extracting features of images having high robustness from an undiscriminating image region while minimizing the number of parameters of a pooling layer.

It is another object of the present invention to provide an image feature extraction device, an image feature extraction method, and a program capable of extracting features of images having high robustness from an undiscriminating image region while minimizing the number of parameters of a pooling layer.

Means for Solving the Problem

An image feature learning device according to the present invention for learning a convolutional neural network for extracting a feature vector of an input image based on training data as a set of a first image, a second image, and a label indicating whether the first image and the second image are relevant images includes: an input unit for receiving input of the training data, the convolutional neural network being configured by including: a fully convolutional layer for performing convolution of the input image to output a feature tensor of the input image; a weighting matrix estimation layer for estimating a weighting matrix indicating a weighting of each element of the feature tensor; and a pooling layer for extracting a feature vector of the input image based on the feature tensor and the weighting matrix; and a parameter learning unit for learning parameters of each layer in the convolutional neural network such that a loss function value obtained by calculating, based on a first feature vector obtained by applying the first image included in the training data to the convolutional neural network as the input image, a second feature vector obtained by applying the second image included in the training data to the convolutional neural network as the input image, and the label included in the training data, a loss function expressed by using a distance between the first feature vector of the first image and the second feature vector of the second image, which are relevant images, becomes smaller.

An image feature learning method according to the present invention for learning a convolutional neural network for extracting a feature vector of an input image based on training data as a set of a first image, a second image, and a label indicating whether the first image and the second image are relevant images includes: receiving, by an input unit, input of the training data, the convolutional neural network being configured by including: a fully convolutional layer for performing convolution of the input image to output a feature tensor of the input image; a weighting matrix estimation layer for estimating a weighting matrix indicating a weighting of each element of the feature tensor; and a pooling layer for extracting a feature vector of the input image based on the feature tensor and the weighting matrix; and learning, by a parameter learning unit, parameters of each layer in the convolutional neural network such that a loss function value obtained by calculating, based on a first feature vector obtained by applying the first image included in the training data to the convolutional neural network as the input image, a second feature vector obtained by applying the second image included in the training data to the convolutional neural network as the input image, and the label included in the training data, a loss function expressed by using a distance between the first feature vector of the first image and the second feature vector of the second image, which are relevant images, becomes smaller.

In the image feature learning device and the image feature learning method according to the present invention, the input unit receives input of the training data, and the parameter learning unit configures the convolutional neural network by including the fully convolutional layer for performing convolution of an input image to output a feature tensor of the input image, the weighting matrix estimation layer for estimating a weighting matrix indicating a weighting of each element of the feature tensor, and the pooling layer for extracting a feature vector of the input image based on the feature tensor and the weighting matrix.

The parameter learning unit learns parameters of each layer in the convolutional neural network such that a loss function value obtained by calculating, based on a first feature vector obtained by applying the first image included in the training data to the convolutional neural network as the input image, a second feature vector obtained by applying the second image included in the training data to the convolutional neural network as the input image, and the label included in the training data, a loss function expressed by using a distance between the first feature vector of the first image and the second feature vector of the second image, which are relevant images, becomes smaller.

As described above, the parameters of each layer in a convolutional neural network are learned such that a loss function value obtained by calculating a loss function expressed by using a distance between a first feature vector of a first image and a second feature vector of a second image, which are relevant images and are obtained by applying the convolutional neural network including a fully convolutional layer for performing convolution of an input image to output a feature tensor of the input image, a weighting matrix estimation layer for estimating a weighting matrix indicating a weighting of each element of the feature tensor, and a pooling layer for extracting a feature vector of the input image based on the feature tensor and the weighting matrix, becomes smaller. Consequently, a neural network for extracting features of images having high robustness from an undiscriminating image region while minimizing the number of parameters of a pooling layer can be learned.

The feature tensor in the image feature learning device according to the present invention may be a three-dimensional tensor corresponding to a height, a width, and channels of the input image, the weighting matrix estimation layer may input the feature tensor to estimate the weighting matrix indicating a weighting of each two-dimensional element corresponding to the height and the width of the input image, and the pooling layer may calculate, for each channel of the input image, a weighted generalized mean of two-dimensional elements corresponding to the height and the width for the channel among three-dimensional elements of the feature tensor and an element of the weighting matrix, and extracts the feature vector formed of a value calculated for each channel.

The image feature learning device according to the present invention may further include a size image generation unit for generating a plurality of the first images and a plurality of the second images by converting, for each of a plurality of magnifications, the first image and the second image included in the training data to a size enlarged or reduced by using the magnification, and may learn parameters of each layer in the convolutional neural network such that a loss function value obtained by calculating, based on a first integrated feature vector obtained by integrating a plurality of the first feature vectors obtained by applying each of a plurality of the first images generated by the size image generation unit to the convolutional neural network as the input image, a second integrated feature vector obtained by integrating a plurality of the second feature vectors obtained by applying each of a plurality of the second images generated by the size image generation unit to the convolutional neural network as the input image, and the label included in the training data, the loss function expressed by using a distance between the first integrated feature vector of the first image and the second integrated feature vector of the second image, which are relevant images, becomes smaller.

An image feature extraction device according to the present invention includes: an input unit for receiving an input image; and an image feature extraction unit for extracting a feature vector of the input image by using the convolutional neural network learned by the above-mentioned image feature learning device.

An image feature extraction method according to the present invention includes: receiving, by an input unit, an input image; and extracting, by an image feature extraction unit, a feature vector of the input image by using the convolutional neural network learned by the above-mentioned image feature learning method.

In the image feature extraction device and the image feature extraction method according to the present invention, the input unit receives an input image, and the image feature extraction unit extracts a feature vector of the input image by using a convolutional neural network learned by the above-mentioned image feature learning device or image feature learning method.

As described above, a convolutional neural network learned by the above-mentioned image feature learning device or image feature learning method is used to extract a feature vector of an input image. Consequently, features of images having high robustness from an undiscriminating image region can be extracted while minimizing the number of parameters of a pooling layer.

The image feature extraction device according to the present invention may further include a size image generation unit for generating a plurality of the input images by converting, for each of a plurality of magnifications, the input image to a size enlarged or reduced by using the magnification, and the image feature extraction unit may extract, for each of the plurality of the input images, a feature vector by using the convolutional neural network, and set a vector obtained by integrating feature vectors extracted for the plurality of the input images as a feature vector of the input image.

A program according to the present invention causes a program to function as each unit in the above-mentioned image feature learning device or image feature extraction device.

Effects of the Invention

The image feature learning device, the image feature learning method, and the program in the present invention enable learning of a neural network for extracting features of images having high robustness from an undiscriminating image region while minimizing the number of parameters of a pooling layer.

The image feature extraction device, the image feature extraction method, and the program in the present invention enable extraction of features of images having high robustness from an undiscriminating image region while minimizing the number of parameters of a pooling layer.

BRIEF DESCRIPTION OF DRAWINGS

FIG. 6 is a diagram illustrating experimental results of the image feature extraction device according to the second embodiment of the present invention.

FIG. 7 is a diagram illustrating experimental results of the image feature extraction device according to the second embodiment of the present invention.

DESCRIPTION OF EMBODIMENTS

Now, embodiments of the present invention are described with reference to the drawings.

<Outline of Image Feature Learning Device According to First Embodiment of Present Invention>

First, the outline of an image feature learning device according to a first embodiment is described.

Figure 1:
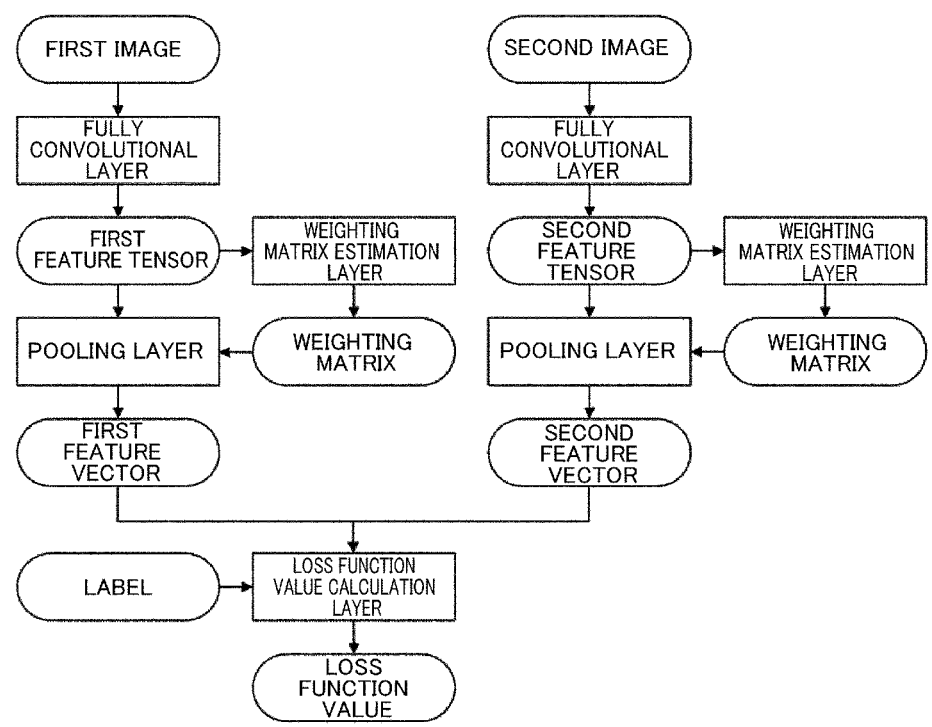
FIG. 1 is an image diagram illustrating an example of a configuration of a CNN according to an embodiment of the present invention.
Figure 12:
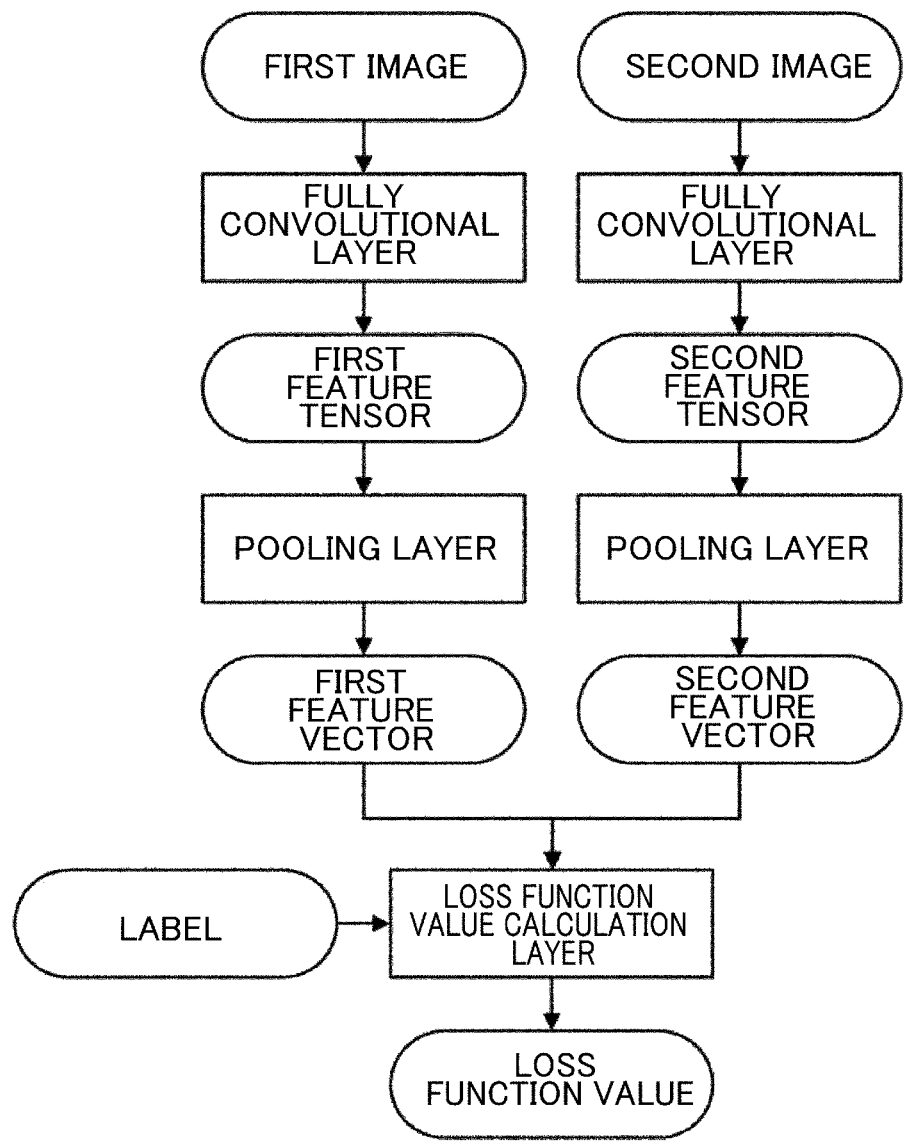
FIG. 12 is an image diagram illustrating an example of a configuration of a CNN in a conventional technology.

In the image feature learning device according to the present embodiment, unlike the configuration of the CNN in conventional image feature learning (FIG. 12), a convolutional neural network (CNN) including a weighting matrix estimation layer for inputting a feature tensor and outputting a weighting matrix, which is a weighting of an element of the feature tensor, is used to estimate the weighting of the element of the feature tensor (FIG. 1).

The weighting matrix is used to control the action of each element of the feature tensor on the pooling and convert the feature tensor into a feature vector. The control method depends on the pooling method, but it does not matter what pooling method is used.

Parameters used for each layer in the CNN are learned by using training data.

FIG. 1 illustrates an example of the structure of a CNN used by the image feature learning device according to the present embodiment. This is an example of the structure in which matching and search of images are tasks.

To learn parameters used in each layer of the CNN, a set of two images and a label indicating whether the images are relevant images are input as training data, and a loss function value is output.

A large number of pieces of training data are given, and the loss function value is minimized to learn the parameters of the CNN.

The CNN includes a fully convolutional layer, a weighting matrix estimation layer, a pooling layer, and a loss function value calculation layer.

The fully convolutional layer inputs an image, and outputs a three-dimensional feature tensor. The weighting matrix estimation layer inputs the feature tensor, and outputs a weighting matrix that stores a weighting of an element of the feature tensor. The pooling layer inputs the feature tensor and the weighting matrix, and outputs a one-dimensional feature vector. The loss function value calculation layer inputs two feature vectors extracted from the two images and the label, and outputs a loss function value.

When a learned CNN is used as an image feature extractor, one image is input, and a feature vector as an output of the pooling layer is extracted and used for image matching and search.

In pooling of elements of a feature tensor, "which action of element should be emphasized" and "which action of element should be suppressed" are automatically estimated as weightings, and the weightings are used to control the function of each element. In this manner, when extracting a feature vector, adverse effect received from an undiscriminating image region can be reduce.

By employing a CNN as a method for estimating a weighting and learning parameters of the CNN from training data, the estimation of weightings and the control of elements suited for an input image can be performed.

As a result, when extracting a feature vector, an image feature extractor having high robustness for an undiscriminating image region can be learned.

<Configuration of Image Feature Learning Device According to First Embodiment of Present Invention>

Figure 2:
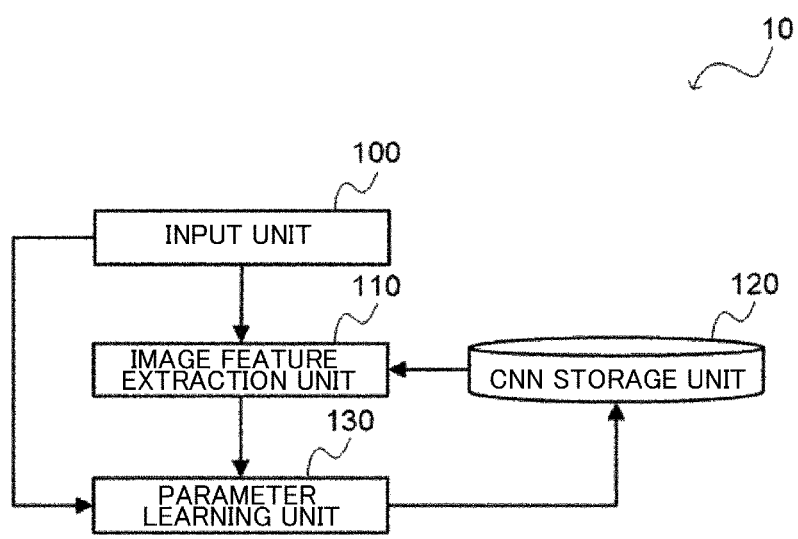
FIG. 2 is a block diagram illustrating a configuration of an image feature learning device according to first and second embodiments of the present invention.

Referring to FIG. 2, a configuration of an image feature learning device 10 according to the embodiment of the present invention is described. FIG. 2 is a block diagram illustrating the configuration of the image feature learning device 10 according to the embodiment of the present invention.

The image feature learning device 10 is configured by a computer including a CPU, a RAM, and a ROM having stored thereon a program for executing a learning processing routine described later, and is functionally configured as follows.

As illustrated in FIG. 2, the image feature learning device 10 according to the present embodiment includes an input unit 100, an image feature extraction unit 110, a CNN storage unit 120, and a parameter learning unit 130.

The input unit 100 receives input of training data as a set of a first image, a second image, and a label indicating whether the first image and the second image are relevant images.

Specifically, the input unit 100 receives input of a plurality of sets of a first image $I_i$, a second image $I_j$, and a label indicating whether the first and second images are relevant image:
$z_{i,j} \in \{0,1\}$
as training data.

The input unit 100 transfers the first images $I_i$ and the second images $I_j$ included in the plurality of pieces of the received training data to the image feature extraction unit 110, and transfers the labels $z_{i,j}$ included in the plurality of pieces of the received training data to the parameter learning unit 130.

The image feature extraction unit 110 extracts feature vectors of the first image $I_i$ and the second image $I_j$.

Specifically, the image feature extraction unit 110 uses the fully convolutional layer for performing convolution of the input image to output a feature tensor X of the input image to determine feature tensors $X_i$ and $X_j$ of the first image $I_i$ and the second image $I_j$.

The feature tensor X is a three-dimensional feature tensor
$X \in \mathbb{R}^{H \times W \times K}$,
where H corresponds to the height of the image, W corresponds to the width of the image, and K corresponds to the number of channels of the image.

Specifically, the image feature extraction unit 110 acquires parameters of a fully convolutional layer stored in the CNN storage unit 120, and adapts the fully convolutional layer to the first image $I_i$ and the second image $I_j$.

As an example of the structure of the fully convolutional layer, VGG (NPL 3) and ResNet101 can be used. When VGG is used for the fully convolutional layer, layers (such as fully connected layer) after the last ReLU layer are removed. That is, the value of an element of a feature tensor output from the fully convolutional layer is controlled to be non-negative.

[Reference 1] Kaiming He, Xiangyu Zhang, Shaoqing Ren, and Jian Sun, "Deep residual learning for image recognition," in CVPR, 2016, pp. 770-778.

The image feature extraction unit 110 uses the weighting matrix estimation layer for estimating a weighting matrix $\Omega$ indicating a weighting of each element of the feature tensor X to determine a weighting matrix $\Omega_i$ indicating a weighting of each element of the feature tensor $X_i$ and a weighting matrix $\Omega_j$ indicating a weighting of each element of the feature tensor $X_j$.

The weighting matrix is $\Omega \in \mathbb{R}^{H \times W}$, which is a matrix composed of a weighting for each two-dimensional element corresponding to the height and the width of an image.

Specifically, the image feature extraction unit 110 acquires the parameters of the weighting matrix estimation layer stored in the CNN storage unit 120, and applies the weighting matrix estimation layer to the feature tensor $X_i$ and the feature tensor $X_j$.

The weighting matrix estimation layer may use any CNN satisfying conditions that non-negative tensors of H×W×K are input and a non-negative matrix of H×W is output. For example, a CNN in which convolutional layers using kernels of 3×3×K×1 and a Softmax layer are combined can be used.

The parameters of the weighting matrix estimation layer may be randomly initialized, or may be initialized such that the values of all elements of the weighting matrix $\Omega$ are the same.

In the above-mentioned example, when the values of all elements of kernels of 3×3×K×1 are initialized to 0 and the value of the bias is also initialized to 0, the values of all elements of the weighting matrix become 1/N in the case of N=H×W.

In some cases, when the learning rate of the parameters of the weighting matrix estimation layer is set to a value higher than that of the fully convolutional layer, better performance is derived. For example, the learning rate of the parameters of the weighting matrix estimation layer may be 10 times the learning rate of the parameter of the fully convolutional layer.

The image feature extraction unit 110 uses the pooling layer for extracting a feature vector
$\overline{y}$
of the input image based on the feature tensor X and the weighting matrix $\Omega$ to determine a first feature vector
$\overline{y}_i$
of a first image $I_i$ based on a feature tensor $X_i$ and a weighting matrix $\Omega_i$ and a second feature vector
$\overline{y}_j$
of a second image $I_j$ based on a feature tensor $X_j$ and a weighting matrix $\Omega_j$.

The feature vector $\bar{y}$ is a one-dimensional feature vector $\bar{y} \in \mathbb{R}^K$ Specifically, the image feature extraction unit 110 acquires the parameters of the pooling layer stored in the CNN storage unit 120, and applies the pooling layer to each of the feature tensor $X_i$ and the weighting matrix $\Omega_i$ and the feature tensor $X_j$ and the weighting matrix $\Omega_j$.

The pooling layer inputs the feature tensor X and the weighting matrix $\Omega$, and uses the weighting matrix $\Omega$ to control the function of the feature tensor X on pooling of each element, thereby converting the feature tensor X, which is a three-dimensional tensor, into a feature vector $\bar{y}$, which is a one-dimensional vector.

The feature tensor X is regarded as a set of K feature matrices of H×W, and a feature matrix corresponding to the k-th channel is set as $x_k \in \mathbb{R}^{H \times W}$, where $k \in \{1, \ldots, K\}$ When N=H×W, the weighting matrix $\Omega$ can be regarded as $\Omega = [\omega_1 \ldots \omega_N]^T$, and $x_k$ can be regarded as $x_k = [\chi_{1,k} \ldots \chi_{N,k}]^T$ The pooling layer first uses the weighting matrix $\Omega$ and the feature tensor X to calculate a one-dimensional feature vector $y = [y_1 \ldots y_K]^T$ As a method for calculating the one-dimensional feature vector y, for example, Equation (1) or Equation (2) below can be used.

[Formula 1]

$$y_k = \sum_{i=1}^{N} \omega_i x_{i,k} \quad (1)$$

$$y_k = \max_{i \in \{1, \ldots, N\}} \omega_i x_{i,k} \quad (2)$$

Next, the pooling layer performs L2 normalization of the one-dimensional feature vector y, and outputs the normalized feature vector as a feature vector $\bar{y}$ The image feature extraction unit 110 transfers an obtained first feature vector $\bar{y}_i$ and an obtained second feature vector $\bar{y}_j$ to the parameter learning unit 130.

The CNN storage unit 120 stores parameters of each layer of the CNN. The CNN in the present embodiment is configured by including a fully convolutional layer for performing convolution of an input image to output a feature tensor of the input image, a weighting matrix estimation layer for estimating a weighting matrix indicating a weighting of each element of the feature tensor, and a pooling layer for extracting a feature vector of the input image based on the feature tensor and the weighting matrix.

Based on a first feature vector $\bar{y}_i$ obtained by applying a first image $I_i$ included in training data to the CNN as an input image, a second feature vector $\bar{y}_j$ obtained by applying a second image $I_j$ included in the training data to the CNN as an input image, and a label $z_{i,j}$ included in the training data, the parameter learning unit 130 learns parameters of each layer in the CNN such that a loss function value $L_{i,j}$ obtained by calculating a loss function expressed by using a distance between the first feature vector $\bar{y}_i$ of the first image $I_i$ and the second feature vector $\bar{y}_j$ of the second image $I_j$, which are relevant images, becomes smaller.

Specifically, the parameter learning unit 130 calculates a loss function expressed by using a distance between the first feature vector $\bar{y}_i$ of the first image $I_i$ and the second feature vector $\bar{y}_j$ of the second image $I_j$, which are relevant images, by using Equation (3) below, and calculates a loss function value $L_{i,j}$ (see NPL 3).

[Formula 2]

$$\mathcal{L}_{i,j} = \begin{cases} \frac{1}{2}\|\bar{y}_i - \bar{y}_j\|_2^2 & \text{if } z_{i,j} = 1 \\ \frac{1}{2}[\max(0, \tau - \|\bar{y}_i - \bar{y}_j\|_2)]^2 & \text{otherwise} \end{cases} \quad (3)$$

where $\tau$ is a hyperparameter, and the value can be selected from, for example, the range of $\tau \in [0.7, 0.85]$ Next, the parameter learning unit 130 learns parameters of each layer in the CNN such that the obtained loss function value $L_{i,j}$ is minimized.

As a learning method, a gradient method as a method for optimizing a loss function is used. Examples of the method include stochastic gradient descent and Adam (Reference 2).

[Reference 2] Diederik P. Kingma and Jimmy Ba. Adam: A method for stochastic optimization. In ICLR, 2015.

In the case of using Adam, for example, when $l_0 = 10^{-6}$, the learning rate of the s-th epoch can be set to $l_0 e^{-0.1s}$.

Minibatch learning is an example of a method for giving training data in learning. For example, when a set of two images and one label are used, the size of minibatch can be set to 30 so that 30 sets of training data can be given for each minibatch.

The parameter learning unit 130 stores the learned parameters of each layer in the CNN in the CNN storage unit 120.

<Functions of Image Feature Learning Device According to First Embodiment of Present Invention>

Figure 3:
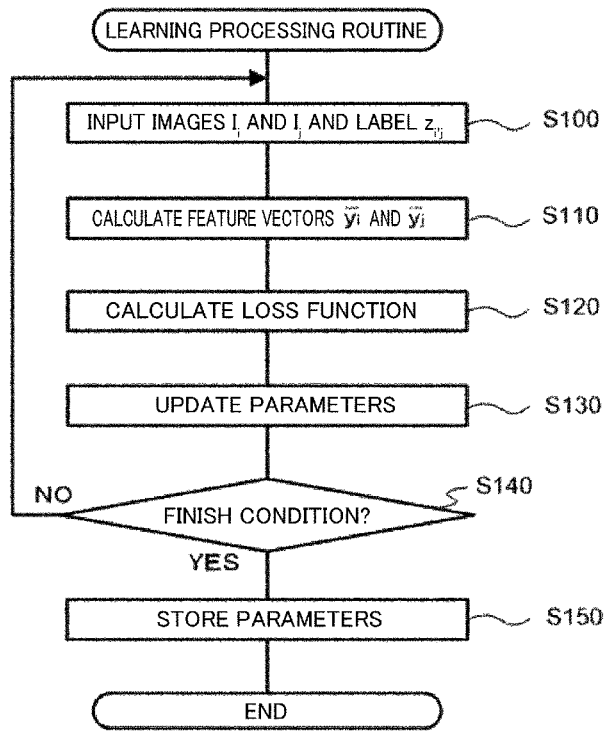
FIG. 3 is a flowchart illustrating a learning processing routine in the image feature learning device according to the first and second embodiments of the present invention.

FIG. 3 is a flowchart illustrating a learning processing routine according to the embodiment of the present invention.

When training data is input to the input unit 100, the learning processing routine illustrated in FIG. 3 is executed in the image feature learning device 10.

First, at Step S100, the input unit 100 receives input of training data as a set of a first image, a second image, and a label indicating whether the first image and the second image are relevant images.

At Step S110, the image feature extraction unit 110 extracts a first feature vector $\overline{y}_i$ of a first image $I_i$ and a second feature vector $\overline{y}_j$ of a second image $I_j$.

At Step S120, based on the first feature vector $\overline{y}_i$ obtained by applying the first image $I_i$ included in training data to the CNN as an input image, the second feature vector $\overline{y}_j$ obtained by applying the second image $I_j$ included in the training data to the CNN as an input image, and a label $z_{i,j}$ included in the training data, the parameter learning unit 130 calculates a loss function value $L_{i,j}$ obtained by calculating a loss function expressed by using a distance between the first feature vector $\overline{y}_i$ of the first image $I_i$ and the second feature vector $\overline{y}_j$ of the second image $I_j$, which are relevant images.

At Step S130, the parameter learning unit 130 updates the parameters of each layer in the CNN such that the loss function value $L_{i,j}$ obtained at Step S120 becomes smaller.

At Step S140, the parameter learning unit 130 determines whether a finish condition is satisfied.

When the finish condition is not satisfied (NO at Step S140), the flow returns to Step S100, where input of training data is received, and the processing of Step S100 to Step S130 is repeated again.

On the other hand, when the finish condition is satisfied (YES at Step S140), at Step S150, the parameter learning unit 130 updates the parameters of each layer in the CNN stored in the CNN storage unit 120 with the finally learned parameters of each layer in the CNN, and finishes the processing.

As described above, the image feature learning device according to the embodiment of the present invention performs the following processing in the following convolutional neural network, thereby being capable of learning a neural network for extracting features of images having high robustness from an undiscriminating image region while minimizing the number of parameters of a pooling layer. The above-mentioned convolutional neural network is configured by including a fully convolutional layer for performing convolution of an input image to output a feature tensor of the input image, a weighting matrix estimation layer for estimating a weighting matrix indicating a weighting of each element of the feature tensor, and a pooling layer for extracting a feature vector of the input image based on the feature tensor and the weighting matrix. The above-mentioned processing is processing for learning parameters of each layer in the convolutional neural network such that a loss function value obtained by calculating a loss function expressed by using a distance between a first feature vector of a first image and a second feature vector of a second image, which are relevant images and are obtained by applying the above-mentioned convolutional neural network, becomes smaller.

<Outline of Image Feature Extraction Device According to First Embodiment of Present Invention>

The outline of an image feature extraction device according to the embodiment of the present invention is described.

The image feature extraction device according to the present embodiment inputs one image for a CNN learned by the image feature learning device, extracts a feature vector as an output of a pooling layer, and uses the feature vector for matching and search of images.

<Configuration of Image Feature Extraction Device According to First Embodiment of Present Invention>

A configuration of an image feature extraction device 20 according to the embodiment of the present invention is described. Note that the same configurations as those in the image feature learning device 10 according to the first embodiment are denoted by the same reference symbols, and detailed descriptions thereof are omitted.

The image feature extraction device 20 is configured by a computer including a CPU, a RAM, and a ROM having stored thereon a program for executing an extraction processing routine described later, and is functionally configured as follows.

Figure 4:
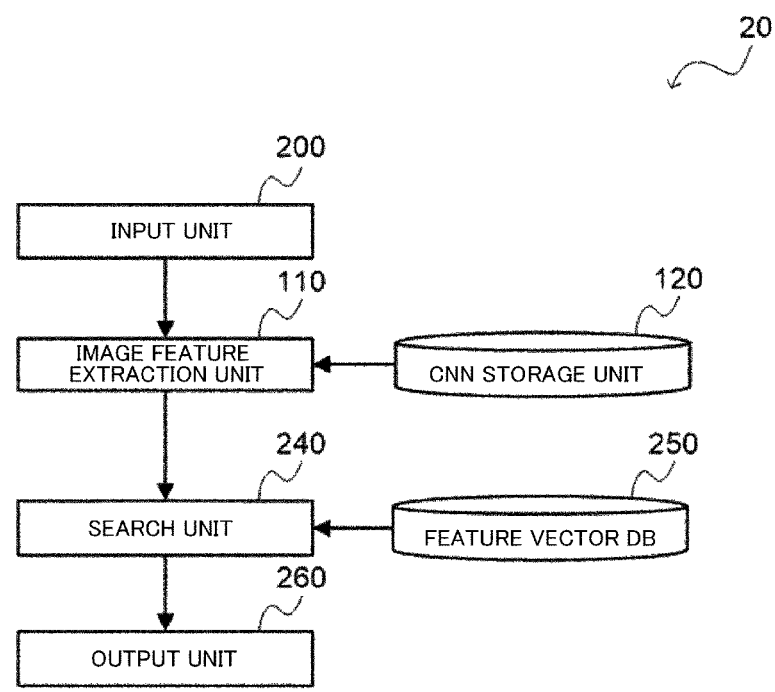
FIG. 4 is a block diagram illustrating a configuration of an image feature extraction device according to the first and second embodiments of the present invention.

As illustrated in FIG. 4, the image feature extraction device 20 according to the present embodiment includes an input unit 200, an image feature extraction unit 110, a CNN storage unit 120, a search unit 240, a feature vector DB 250, and an output unit 260.

The input unit 200 receives input of an input image I, and transfers the received input image I to the image feature extraction unit 110.

The image feature extraction unit 110 uses a CNN learned by the image feature learning device 10 to extract a feature vector $\overline{y}$ of the input image I.

In other words, in the CNN storage unit 120, parameters of each layer in the CNN learned by the image feature learning device 10 are stored.

In the feature vector DB 250, feature vectors of reference images and information on the reference images are stored in association with each other. The feature vector of the reference image is extracted by using a CNN learned by the image feature learning device 10.

The image feature extraction unit 110 transfers the extracted feature vector $\overline{y}$ of the input image I to the search unit 240.

The search unit 240 uses the feature vector $\overline{y}$ of the input image I obtained by the image feature extraction unit 110 to perform matching with feature vectors of reference images stored in the feature vector DB 250, thereby searching for the most similar feature vector.

The search unit 240 transfers information on a reference image associated with the obtained feature vector to the output unit 260.

The output unit 260 outputs the information on the reference image obtained by the search unit 240.

<Functions of Image Feature Extraction Device According to First Embodiment of Present Invention>

Figure 5:
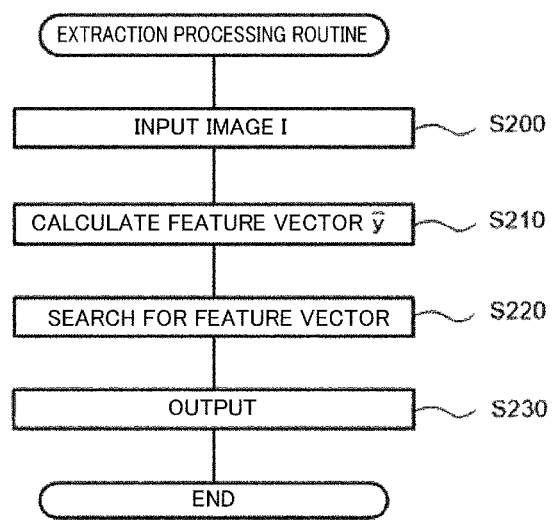
FIG. 5 is a flowchart illustrating an extraction processing routine in the image feature extraction device according to the present invention.

FIG. 5 is a flowchart illustrating an extraction processing routine according to the first embodiment of the present invention.

When an input image I is input to the input unit 200, the extraction processing routine illustrated in FIG. 5 is executed in the image feature extraction device 20.

First, at Step S200, the input unit 200 receives input of the input image I.

At Step S210, the image feature extraction unit 110 determines a feature vector
$\bar{y}$
of the input image I.

At Step S220, the search unit 240 uses the feature vector
$\bar{y}$
of the input image I obtained at Step S230 to perform matching with feature vectors of reference images stored in the feature vector DB 250, thereby searching for the most similar feature vector.

At Step S230, the output unit 260 outputs information on a reference image associated with the feature vector obtained at Step S220.

As described above, the image feature extraction device according to the present embodiment uses a convolutional neural network learned by the image feature learning device to extract a feature vector of an input image, thereby being capable of extracting features of images having high robustness from an undiscriminating image region while minimizing the number of parameters of a pooling layer.

<Outline of Image Feature Learning Device According to Second Embodiment of Present Invention>

The outline of a second embodiment of the present invention is described.

In the present embodiment, the weightings of elements of a feature tensor are used, and the pooling layer calculates a weighted generalized mean of elements of the feature tensor that act on the first and second dimensions corresponding to the height and the width of an input image in the three dimensions of the feature tensor and that are along the two dimensions, and outputs a vector formed of the obtained calculated value as a feature vector.

By employing such a configuration, it is possible to employ a weighted generalized mean as a method for pooling elements of the feature tensor, and learn the parameters of the weighted generalized mean and some parameters (weights) from training data, so that a pooling method that is well adapted to the data can be implemented.

As a result, a neural network for extracting features of images having high robustness from an undiscriminating image region can be learned.

<Configuration of Image Feature Learning Device According to Second Embodiment of Present Invention>

An image feature extraction unit 110 in an image feature learning device 10 according to the second embodiment of the present invention is described. Note that configurations other than the pooling layer are the same as in the image feature learning device 10 according to the first embodiment, and hence detailed descriptions thereof are omitted.

The image feature extraction unit 110 calculates, for each channel of an input image, a weighted generalized mean of each two-dimensional element corresponding to the height and the width for the channel in three-dimensional elements of a feature tensor X and each element of a weighting matrix $\Omega$, and uses a pooling layer for extracting a feature vector
$\bar{y}$
formed of a value calculated for each channel to determine a first feature vector
$\bar{y}_i$
of a first image $I_i$ based on a feature tensor $X_i$ and a weighting matrix $\Omega_i$ and a second feature vector
$\bar{y}_j$
of a second image $I_j$ based on a feature tensor X % and a weighting matrix $\Omega_j$.

Specifically, the image feature extraction unit 110 acquires the parameters of the pooling layer stored in the CNN storage unit 120, and applies the pooling layer to each of the feature tensor $X_i$ and the weighting matrix $\Omega_i$ and the feature tensor $X_j$ and the weighting matrix $\Omega_j$.

The pooling layer first uses the weighting matrix $\Omega$ and the feature tensor X to calculate a one-dimensional feature vector
$y=[y_1 \ldots y_K]^T$ In the present embodiment, Equation (4) below is used as a method for calculating the one-dimensional feature vector y.

[Formula 3]

$$y_k = \left( \sum_{i=1}^{N} \omega_i x_{i,k}^p \right)^{1/p} \quad (4)$$

Next, the pooling layer performs L2 normalization of the one-dimensional feature vector y, and outputs the normalized feature vector as a feature vector
$\bar{y}$
where p is a parameter of the pooling layer, and is learned by the parameter learning unit 130 together with parameters of the fully convolutional layer and the weighting matrix estimation layer.

When initializing p, for example, the value can be selected from the range of
$p \in [2,5]$ In some cases, when the learning rate of p is set to a value higher than that of the fully convolutional layer, better performance is derived. For example, the learning rate of p may be 10 times the learning rate of the parameter of the fully convolutional layer. The weight decay of p is set to 0.

The image feature extraction unit 110 transfers an obtained first feature vector
$\bar{y}_i$
and an obtained second feature vector
$\bar{y}_j$
to the parameter learning unit 130.

<Functions of Image Feature Learning Device According to Second Embodiment of Present Invention>

Referring to FIG. 3, a learning processing routine according to the second embodiment of the present invention is described. Note that the same processing as in the learning processing routine according to the first embodiment is denoted by the same reference symbol, and detailed descriptions thereof are omitted.

At Step S110, the image feature extraction unit 110 extracts a first feature vector
$\bar{y}_i$
of a first image $I_i$ and a second feature vector
$\bar{y}_j$
of a second image $I_j$.

In this case, the image feature extraction unit 110 calculates, for each channel of the input image, a weighted generalized mean of each two-dimensional element corresponding to the height and the width for the channel among three-dimensional elements of a feature tensor X and each element of a weighting matrix $\Omega$ in accordance with Equation (4) above, and uses a pooling layer for extracting a feature vector
$\bar{y}$
formed of a value calculated for each channel to determine the first feature vector
$\bar{y}_i$
of the first image $I_i$ based on a feature tensor $X_i$ and a weighting matrix $\Omega_i$ and a second feature vector $\overline{y}_j$ of the second image $I_j$ based on a feature tensor $X_j$ and a weighting matrix $\Omega_j$.

As described above, in the image feature learning device according to the present embodiment, the pooling layer calculates, for each channel of an input image, a weighted generalized mean of two-dimensional elements corresponding to the height and the width for the channel among three-dimensional elements of the feature tensor and an element of the weighting matrix, and extracts the feature vector formed of a value calculated for each channel, thereby learning the parameters of each layer in the CNN. Consequently, a neural network for extracting features of images having higher robustness from an undiscriminating image region can be learned.

<Configuration of Image Feature Extraction Device According to Second Embodiment of Present Invention>

An image feature extraction device according to the second embodiment of the present invention is obtained by applying the image feature extraction unit 110 in the image feature learning device 10 according to the second embodiment to the image feature extraction device according to the first embodiment, and hence detailed descriptions thereof are omitted.

<Functions of Image Feature Extraction Device According to Second Embodiment of Present Invention>

An extraction processing routine according to the second embodiment of the present invention is obtained by applying Step S110 in the learning processing routine according to the second embodiment to the extraction processing routine according to the first embodiment, and hence detailed descriptions thereof are omitted.

<Experimental Results of Image Feature Extraction Device According to Second Embodiment of Present Invention>

Experimental results using the image feature extraction device according to the present embodiment are described.

<<Preparation for Experiment>>

In this experiment, ResNet101 (Reference 1) was used as an initial value of a fully convolutional layer of a CNN.

As in NPL 3 and Reference 3, parameters of the CNN according to the present embodiment were trained by using a training data set of a pair of images obtained from images of 163 K or more.

[Reference 3] Filip Radenovic, Giorgos Tolias, and Ondrej Chum, "Finetuning CNN image retrieval with no human annotation," CoRR, 2017.

Parameter learning was performed in 30 epochs, and the best CNN was selected based on the average accuracy (MAP) on the validation dataset. For each epoch, about 6 K and 1.7 K tuples were selected for learning and validation. Each tuple contains one query, one positive image, and five negative images.

Adam (Reference 2) was used with an initial learning rate of $l_0=10^{-6}$, an exponential decay of epoch s of $l_0 e^{-0.1s}$, and a batch size of five tuples.

The hyperparameter T in Equation (3) was set to 0.85. For the 3×3 convolutional layers for generating a 2D mask, both the filter weightings and the bias were initialized to 0 so that all $\omega_i$ belonging to the weighting matrix $\Omega$ were equal in the first iteration.

For validation, three benchmarks (Oxford5K (Reference 4), Oxford105K (Reference 4), and Paris6K (Reference 5)) commonly used in image search at instance level were used.

[Reference 4] James Philbin, Ondrej Chum, Michael Isard, Josef Sivic, and Andrew Zisserman, "Object retrieval with large vocabularies and fast spatial matching," in CVPR, 2007.

[Reference 5] James Philbin, Ondrej Chum, Michael Isard, Josef Sivic, and Andrew Zisserman, "Lost in quantization: Improving particular object retrieval in large scale image databases," in CVPR, 2008.

The MAP was used as performance measurement values of all training data sets.

<<Experimental Results>>

First, the performance of the CNN according to the present embodiment was analyzed by comparison with GeM (Reference 3).

In Equation (4), p can be configured by various methods. For example, various methods such as (1) p shared with all channels is used, (2) $p_k$ that depends on a channel having $k \in \{1, \ldots, K\}$ is used, and (3) p is used as a hyperparameter can be used.

FIG. 6 illustrates results of the experiment using different initial values for p by employing the same strategy as in Reference 3.

In FIG. 6, the present embodiment consistently outperformed GeM in Oxford5K, although there was little difference with GeM in Paris6K at any initial value of p.

Next, the method in the present embodiment was combined with the query extension (QE) (Reference 6) commonly used for deep image search.

[Reference 6] Ondrej Chum, James Philbin, Josef Sivic, Michael Isard, and Andrew Zisserman, "Total recall: Automatic query expansion with a generative feature model for object retrieval," in ICCV, 2007, pp. 1-8.

In this experiment, $n_{QE}=10$ was set in Oxford5K and Oxford105K, and $nQ_E=50$ was set in Paris6K.

As illustrated in FIG. 7, it was understood that after combined with QE, the CNN according to the present embodiment further improved the performance and was superior to all data set technologies.

As described above, the image feature extraction device according to the present embodiment uses a convolutional neural network learned by the image feature learning device according to the second embodiment to extract a feature vector of an input image, thereby being capable of extracting features of images having higher robustness from an undiscriminating image region while minimizing the number of parameters of a pooling layer.

<Outline of Image Feature Learning Device According to Third Embodiment of Present Invention>

The outline of an image feature learning device according to an embodiment of the present invention is described.

In the present embodiment, a plurality of magnifications are used to change the sizes of a first image and a second image, and feature vectors are extracted from each of a plurality of the obtained first images and a plurality of the obtained second images.

In this case, a first integrated feature vector obtained by integrating feature vectors of the plurality of first images with different sizes is calculated, and set as a feature vector of the first image. A second integrated feature vector obtained by integrating feature vectors of the plurality of second images with different sizes is calculated, and set as a feature vector of the second image.

Such a configuration enables a CNN to be learned with higher accuracy.

<Configuration of Image Feature Learning Device According to Third Embodiment of Present Invention>

A configuration of an image feature learning device 30 according to the third embodiment of the present invention is described. Note that the same configurations as in the image feature learning device 10 according to the first or second embodiment are denoted by the same reference symbols, and detailed descriptions thereof are omitted.

The image feature learning device 30 is configured by a computer including a CPU, a RAM, and a ROM having stored thereon a program for executing a learning processing routine described later, and is functionally configured as follows.

Figure 8:
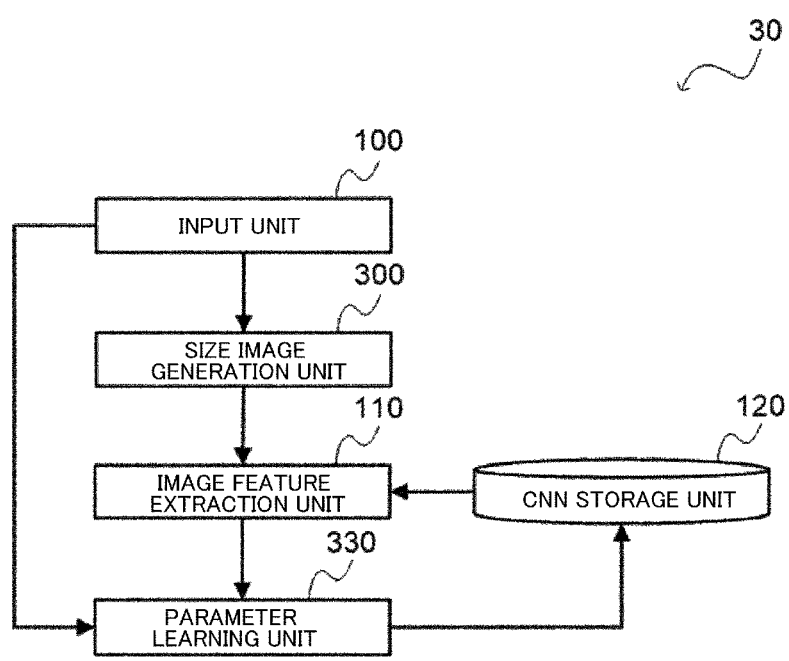
FIG. 8 is a block diagram illustrating a configuration of an image feature learning device according to a third embodiment of the present invention.

As illustrated in FIG. 8, the image feature learning device 30 according to the present embodiment includes an input unit 100, a size image generation unit 300, an image feature extraction unit 110, a CNN storage unit 120, and a parameter learning unit 330.

The size image generation unit 300 generates a plurality of first image $I_i$ and a plurality of second images $I_j$ by converting, for each of a plurality of magnifications r, a first image $I_i$ and a second image $I_j$ included in training data to a size enlarged or reduced by using the magnification r.

Specifically, the size image generation unit 300 converts, for each of a plurality of predetermined magnifications r, a first image $I_i$ and a second image $I_j$ received by the input unit 100 to a size enlarged or reduced by using the magnification r.

s magnifications r are expressed by $r=\{r_1, \ldots, r_s\}$. For example, when s=3 and r={0.5, 1.0, 2.0}, first images $I_i$ with sizes enlarged or reduced by using the magnifications r can be expressed by images $I_{i,1}$, $I_{i,2}$, and $I_{i,3}$. The image $I_{i,1}$ is an image with a size reduced to 0.5 times of the height and the width of the first image $I_i$. The image $I_{i,2}$ is an image with a size obtained by multiplying the height and the width of the first image $I_i$ by 1 (that is, image without conversion). The image $I_{i,3}$ is an image with a size enlarged to 2 times of the height and the width of the first image $I_i$.

The size image generation unit 300 transfers the plurality of the converted first images $I_i$ and the plurality of the converted second image $I_j$ to the image feature extraction unit 110.

The image feature extraction unit 110 determines a plurality of first feature vectors
$\overline{y}_i$
obtained by applying each of the plurality of first images $I_i$ generated by the size image generation unit 300 to the CNN as an input image, and calculates a first integrated feature vector
$\overline{y}_i$
obtained by integrating the plurality of first feature vectors of the first image $I_i$.

The image feature extraction unit 110 determines a plurality of second feature vectors
$\overline{y}_j$
obtained by applying each of the plurality of second images $I_j$ generated by the size image generation unit 300 to the CNN as an input image, and calculates a second integrated feature vector
$\overline{y}_j$
obtained by integrating the plurality of second feature vectors of the second image $I_j$.

As the method for integration, a method for averaging a plurality of feature vectors, a method for selecting the maximum value or the minimum value for each element, or a method for calculating the generalized mean can be used.

In the case of calculating the generalized mean, a parameter p of the generalized mean is also learned.

In the following, for the sake of convenience, the first integrated feature vector is expressed by using
$\overline{y}_i$,
and the second integrated feature vector is expressed by using
$\overline{y}_j$.

The image feature extraction unit 110 transfers the calculated first integrated feature vector
$\overline{y}_i$ and the calculated second integrated feature vector to the parameter learning unit 300.
$\overline{y}_j$ Based on the first integrated feature vector obtained by integrating the plurality of first feature vectors
$\overline{y}_i$
obtained by applying each of the plurality of first images $I_i$ generated by the size image generation unit 300 to the CNN as an input image, the second integrated feature vector obtained by integrating the plurality of second feature vectors
$\overline{y}_j$
obtained by applying each of the plurality of second image $I_j$ generated by the size image generation unit 300 to the CNN as an input image, and a label $z_{i,j}$ included in training data, the parameter learning unit 330 calculates a loss function expressed by using a distance between the first integrated feature vector and the second integrated feature vector of the first image $I_i$ and the second image $I_j$, which are relevant images, and learns parameters of each layer in the CNN such that an obtained loss function value becomes smaller.

Specifically, the parameter learning unit 330 calculates a loss function expressed by using a distance between the first integrated feature vector
$\overline{y}_i$
of the first image $I_i$ and the second integrated feature vector
$\overline{y}_j$
of the second image $I_j$, which are relevant images, and calculates a loss function value $L_{i,j}$.

Next, the parameter learning unit 330 learns parameters of each layer in the CNN such that the obtained loss function value $L_{i,j}$ is minimized. The same learning method as in the first embodiment can be employed.

The parameter learning unit 330 stores the learned parameters of each layer in the CNN in the CNN storage unit 120.

<Functions of Image Feature Learning Device According to Third Embodiment of Present Invention>

Figure 9:
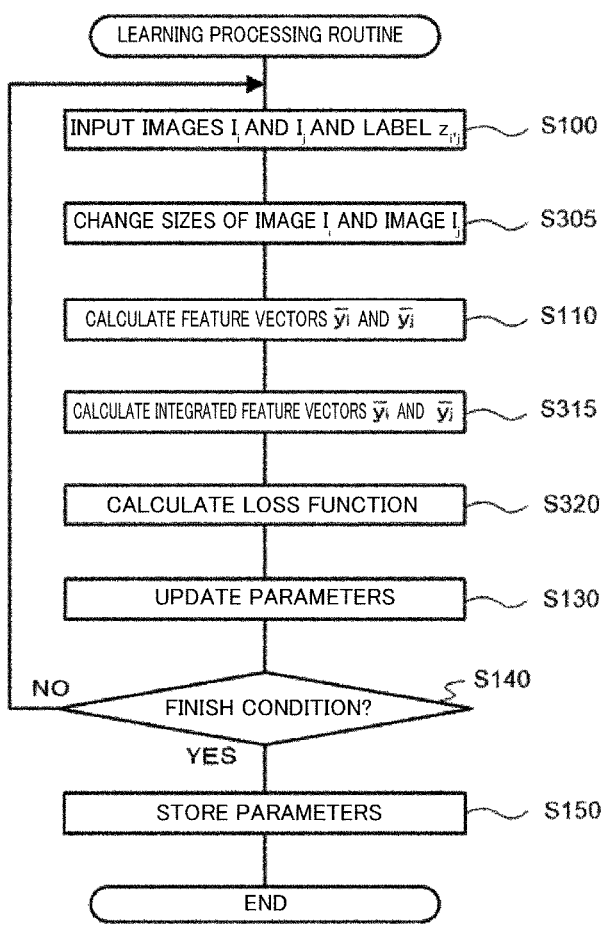
FIG. 9 is a flowchart illustrating a learning processing routine in the image feature learning device according to the third embodiment of the present invention.

FIG. 9 is a flowchart illustrating a learning processing routine according to the third embodiment of the present invention. Note that the same processing as in the learning processing routine according to the first embodiment is denoted by the same reference symbol, and detailed descriptions thereof are omitted.

At Step S305, the size image generation unit 300 generates a plurality of first images $I_i$ and a plurality of second images $I_j$ by converting, for each of a plurality of magnifications r, a first image $I_i$ and a second image $I_j$ included in training data to a size enlarged or reduced by using the magnification r.

At Step S315, the image feature extraction unit 110 calculates a first integrated feature vector obtained by integrating a plurality of first feature vectors $\overline{y}_i$ of the first image $I_i$ and a second integrated feature vector obtained by integrating a plurality of second feature vectors $\overline{y}_j$ of the second image $I_j$, which are relevant images.

At Step S320, the parameter learning unit 330 calculates a loss function expressed by using a distance between the first integrated feature vector $\overline{y}_i$ of the first image $I_i$ and the second integrated feature vector $\overline{y}_j$ of the second image $I_j$, which are relevant images, and calculates a loss function value $L_{i,j}$.

As described above, the image feature learning device according to the present embodiment can accurately learn a neural network for extracting features of images having high robustness from an undiscriminating image region while minimizing the number of parameters of a pooling layer through the following processing. The above-mentioned processing is processing in which the image feature learning device according to the present embodiment generates a first integrated feature vector obtained by integrating a plurality of first feature vectors obtained by applying each of a plurality of first images generated by converting, for each of a plurality of magnifications, a first image included in training data to a size enlarged or reduced by using the magnification to a convolutional neural network as an input image. Further, the above-mentioned processing is processing in which the image feature learning device according to the present embodiment generates a second integrated feature vector obtained by integrating a plurality of second feature vectors obtained by applying each of a plurality of second images generated by converting, for each of a plurality of magnifications, a second image included in training data to a size enlarged or reduced by using the magnification to the convolutional neural network as an input image. Further, the above-mentioned processing is processing in which the image feature learning device according to the present embodiment learns, based on the generated first integrated feature vector, the generated second integrated feature vector, and a label included in the training data, parameters of each layer in the convolutional neural network such that a loss function value obtained by calculating a loss function expressed by using a distance between the first integrated feature vector of the first image and the second integrated feature vector of the second image, which are relevant images, becomes smaller.

<Outline of Image Feature Extraction Device According to Third Embodiment of Present Invention>

The outline of an image feature extraction device according to an embodiment of the present invention is described.

In image recognition, even if the same object is captured in an image, the size of the target object in the image may be different or the appearance of the object may be different, such as the degree of blurring, depending on the photographing distance and the way of focusing.

In the present embodiment, a plurality of magnifications are used to change the size of an input image, and a plurality of feature vectors are extracted from a plurality of obtained input images by using a learned CNN. An integrated feature vector obtained by integrating the feature vectors is calculated and set as a feature vector of the input image.

Such a configuration can reduce the effect on the performance of image recognition caused when the sizes are different, and more accurately extract feature vectors of images.

<Configuration of Image Feature Extraction Device According to Third Embodiment of Present Invention>

A configuration of an image feature extraction device 40 according to the embodiment of the present invention is described. Note that the same configurations as in the image feature extraction device 20 according to the first embodiment are denoted by the same reference symbols, and detailed descriptions thereof are omitted.

The image feature extraction device 40 is configured by a computer including a CPU, a RAM, and a ROM having stored thereon a program for executing a learning processing routine described later, and is functionally configured as follows.

Figure 10:
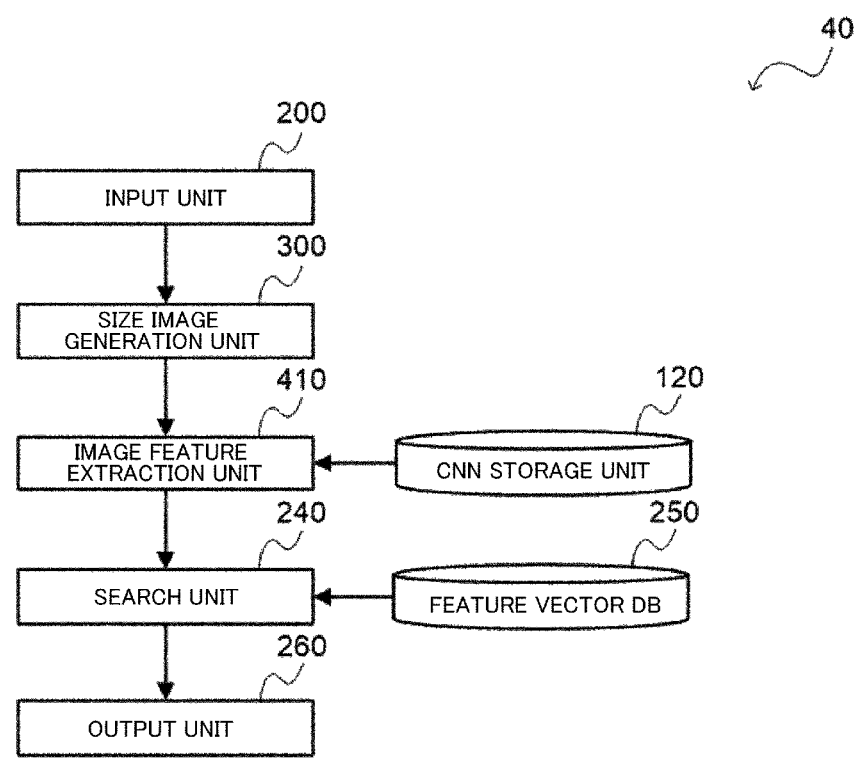
FIG. 10 is a block diagram illustrating a configuration of an image feature extraction device according to a third embodiment of the present invention.

As illustrated in FIG. 10, the image feature extraction device 40 according to the present embodiment includes an input unit 100, a size image generation unit 300, an image feature extraction unit 410, a CNN storage unit 120, a search unit 240, a feature vector DB 250, and an output unit 260.

The size image generation unit 300 generates a plurality of input images I by converting, for each of a plurality of magnifications r, an input image I to a size enlarged or reduced by using the magnification r.

Specifically, the size image generation unit 300 converts, for each of a plurality of predetermined magnifications r, an input image I received by the input unit 200 to a size enlarged or reduced by using the magnification r.

The size conversion is the same as that in the size image generation unit 300 in the image feature learning device 30.

The size image generation unit 300 transfers the plurality of converted input images I to the image feature extraction unit 110.

The CNN storage unit 120 stores therein parameters of each layer in a CNN learned by the image feature learning device 30.

The image feature extraction unit 410 extracts, for each of the plurality of input images I, a feature vector $\overline{y}$ by using the convolutional neural network, and sets a vector obtained by integrating feature vectors $\overline{y}$ extracted for the plurality of input images I as a feature vector $\overline{y}$ of the input image I.

Specifically, the image feature extraction unit 410 uses the fully convolutional layer for performing convolution of an input image to output a feature tensor X of the input image to determine, for each of a plurality of input images I generated by the size image generation unit 300, a feature tensor X of the input image I.

The image feature extraction unit 410 uses the weighting matrix estimation layer for estimating a weighting matrix $\Omega$ indicating a weighting of each element of the feature tensor X to determine, for each of the plurality of feature tensors X, a weighting matrix $\Omega$ indicating a weighting of each element of the feature tensor X.

The image feature extraction unit 410 uses the pooling layer for extracting a feature vector of the input image based on the feature tensor X and the weighting matrix Ω to determine, for each of the plurality of input images I, a feature vector
$\bar{y}$
of the input image I based on the feature tensor X and the weighting matrix Ω of the input image I, and calculates an integrated feature vector
$\bar{y}$
obtained by integrating a plurality of feature vectors
$\bar{y}$
of the input image I.

As the method for integration, a method for averaging a plurality of feature vectors, a method for selecting the maximum value or the minimum value for each element, or a method for calculating the generalized mean can be used. In the case of calculating the generalized mean, a parameter p of the generalized mean is also learned.

As the method for integrating the feature vectors
$\bar{y}$,
a method for averaging a plurality of feature vectors, a method
for selecting the maximum value or the minimum value for each element, or a method for calculating the generalized mean can be used. In the case of calculating the generalized mean, a learned parameter p of the generalized mean (stored in CNN storage unit 120) is used.

The image feature extraction unit 410 transfers the extracted feature vector
$\bar{y}$
of the input image I to the search unit 240.

In the feature vector DB 250, feature vectors of reference images and information on the reference images are stored in association with each other. The feature vector of the reference image is extracted by using a CNN learned by the image feature learning device 10, and is obtained by integrating feature vectors extracted for a plurality of images obtained by reducing or enlarging the reference image.

<Functions of Image Feature Extraction Device According to Third Embodiment of Present Invention>

Figure 11:
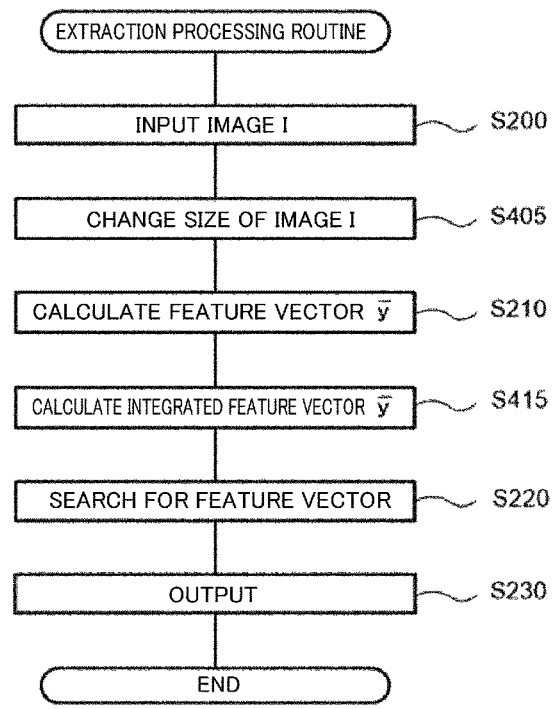
FIG. 11 is a flowchart illustrating an extraction processing routine in the image feature extraction device according to the third embodiment of the present invention.

FIG. 11 is a flowchart illustrating an extraction processing routine according to the third embodiment of the present invention. Note that the same processing as in the extraction processing routine according to the first embodiment is denoted by the same reference symbol, and detailed descriptions thereof are omitted.

At Step S405, the size image generation unit 300 generates a plurality of input images I by converting, for each of a plurality of magnifications r, an input image I to a size enlarged or reduced by using the magnification r.

At Step S415, the image feature extraction unit 410 calculates an integrated feature vector obtained by integrating a plurality of feature vectors
$\bar{y}$
of the input image I.

As described above, the image feature extraction device according to the present embodiment can more accurately extract features of images having high robustness from an undiscriminating image region while minimizing the number of parameters of a pooling layer through the following processing. The above-mentioned processing is processing in which the image feature extraction device according to the present embodiment further includes the size image generation unit for generating a plurality of input images by converting, for each of a plurality of magnifications, an input image to a size enlarged or reduced by using the magnification, and extracts, for each of a plurality of input images, a feature vector by using the convolutional neural network. Further, the above-mentioned processing is processing in which the image feature extraction device according to the present embodiment sets a vector obtained by integrating feature vectors extracted for the plurality of input images as a feature vector of the input image.

Note that the present invention is not limited to the above-mentioned embodiment, and can be variously modified and applied within the range not departing from the gist of the invention.

For example, validation data may be prepared for the parameter learning unit 130 and used for learning. For example, the number of epochs may be 30, and training data may be repeated 30 times to learn the parameters of each layer in the CNN. As a result, 30 learned CNNs can be obtained.

In this case, each learned CNN is validated with validation data, and a CNN with good performance is used as a result. The proportion of training data and validation data may be, for example 3.5:1.

In the third embodiment, the image feature learning device 30 calculates a loss function value after integrating a plurality of feature vectors with an integrated feature vector for each of a first image $I_i$ and a second image $I_j$ that are relevant images, thereby learning the parameters of each layer in the CNN. However, the embodiment is not limited thereto, and a loss function value may be calculated by using a feature vector each of the first image $I_i$ and the second image $I_j$ that are relevant images without integration, and the parameters of each layer in the CNN may be learned such that the loss function value is minimized.

The image feature learning device 30 may learn the parameters of each layer in the CNN without changing the image sizes of the first image $I_i$ and the second image $I_j$ that are relevant images similarly to the above-mentioned first embodiment.

In the specification of the present application, the embodiments in which a program has been installed in advance are described above, but the program may be stored in a computer-readable recording medium and provided.

REFERENCE SIGNS LIST

10 Image feature learning device
20 Image feature extraction device
30 Image feature learning device
40 Image feature extraction device
100 Input unit
110 Image feature extraction unit
120 CNN storage unit
130 Parameter learning unit
200 Input unit
240 Search unit
250 Feature vector DB
260 Output unit
300 Size image generation unit
330 Parameter learning unit
410 Image feature extraction unit

The invention claimed is:

1. An image feature learning device for learning a convolutional neural network for extracting a feature vector of an input image based on training data as a set of a first image, a second image, and a label indicating whether the first image and the second image are relevant images, comprising:

an input receiver configured to receive input of the training data, the convolutional neural network being configured by including:
  a fully convolutional layer for performing convolution of the input image to output a feature tensor of the input image;
  a weighting matrix estimation layer for estimating a weighting matrix indicating a weighting of each element of the feature tensor; and
  a pooling layer for extracting a feature vector of the input image based on the feature tensor and the weighting matrix; and
a parameter learner configured to learn parameters of each layer in the convolutional neural network such that a loss function value obtained by calculating,
  based on:
    a first feature vector obtained by applying the first image included in the training data to the convolutional neural network as the input image,
    a second feature vector obtained by applying the second image included in the training data to the convolutional neural network as the input image, and
    the label included in the training data,
  a loss function expressed by using a distance between the first feature vector of the first image and the second feature vector of the second image, which are relevant images, becomes smaller.

2. The image feature learning device according to claim 1, wherein the feature tensor is a three-dimensional tensor corresponding to a height, a width, and channels of the input image,
  wherein the weighting matrix estimation layer inputs the feature tensor to estimate the weighting matrix indicating a weighting of each two-dimensional element corresponding to the height and the width of the input image, and
  wherein the pooling layer calculates, for each channel of the input image, a weighted generalized mean of two-dimensional elements corresponding to the height and the width for the channel among three-dimensional elements of the feature tensor and an element of the weighting matrix and extracts the feature vector formed of a value calculated for each channel.

3. The image feature learning device according to claim 2, further comprising:
  generating a plurality of the first images and a plurality of the second images by converting, for each of a plurality of magnifications, the first image and the second image included in the training data to a size enlarged or reduced by using the magnification,
    wherein the image feature learning device learns parameters of each layer in the convolutional neural network such that: a loss function value obtained by calculating,
      based on:
        a first integrated feature vector obtained by integrating a plurality of the first feature vectors obtained by applying each of a plurality of the first images generated by the size image generator to the convolutional neural network as the input image,
        a second integrated feature vector obtained by integrating a plurality of the second feature vectors obtained by applying each of a plurality of the second images generated by the size image generator to the convolutional neural network as the input image, and
        the label included in the training data,
      the loss function expressed by using a distance between the first integrated feature vector of the first image and the second integrated feature vector of the second image, which are relevant images, becomes smaller.

4. The image feature learning device according to claim 2, the device further comprising:
  the input receiver configured to receive an input image; and
  an image feature extractor configured to extract a feature vector of the input image by using the convolutional neural network learned by the image feature learning device.

5. The image feature learning device according to claim 1, further comprising:
  a size image generator configured to generate a plurality of the first images and a plurality of the second images by converting, for each of a plurality of magnifications, the first image and the second image included in the training data to a size enlarged or reduced by using the magnification, wherein the image feature learning device learns parameters of each layer in the convolutional neural network such that:
    a loss function value obtained by calculating,
      based on:
        a first integrated feature vector obtained by integrating a plurality of the first feature vectors obtained by applying each of a plurality of the first images generated by the size image generator to the convolutional neural network as the input image,
        a second integrated feature vector obtained by integrating a plurality of the second feature vectors obtained by applying each of a plurality of the second images generated by the size image generator to the convolutional neural network as the input image, and
        the label included in the training data,
      the loss function expressed by using a distance between the first integrated feature vector of the first image and the second integrated feature vector of the second image, which are relevant images, becomes smaller.

6. The image feature learning device according to claim 1, the device further comprising:
  the input receiver configured to receive an input image; and
  an image feature extractor configured to extract a feature vector of the input image by using the convolutional neural network learned by the image feature learning device.

7. The image feature learning device according to claim 6, further comprising a size image generator configured to generate a plurality of the input images by converting, for each of a plurality of magnifications, the input image to a size enlarged or reduced by using the magnification, wherein the image feature extractor configured to extract, for each of the plurality of the input images, a feature vector by using the convolutional neural network, and set a vector obtained by integrating feature vectors extracted for the plurality of the input images as a feature vector of the input image.

8. An image feature learning method for learning a convolutional neural network for extracting a feature vector of an input image based on training data as a set of a first image, a second image, and a label indicating whether the first image and the second image are relevant images, comprising:
- receiving, by a receiver, input of the training data, the convolutional neural network being configured by including:
  - a fully convolutional layer for performing convolution of the input image to output a feature tensor of the input image;
  - a weighting matrix estimation layer for estimating a weighting matrix indicating a weighting of each element of the feature tensor; and
  - a pooling layer for extracting a feature vector of the input image based on the feature tensor and the weighting matrix; and
- learning, by a parameter learner, parameters of each layer in the convolutional neural network such that a loss function value obtained by calculating,
  - based on:
    - a first feature vector obtained by applying the first image included in the training data to the convolutional neural network as the input image,
    - a second feature vector obtained by applying the second image included in the training data to the convolutional neural network as the input image, and
    - the label included in the training data,
  - a loss function expressed by using a distance between the first feature vector of the first image and the second feature vector of the second image, which are relevant images, becomes smaller.

9. The image feature learning method of claim 8, comprising:
- receiving, by the receiver, an input image; and
- extracting, by an image feature extractor, a feature vector of the input image by using the convolutional neural network learned by the image feature learning method according to claim 8.

10. The image feature learning method of claim 8, wherein the feature tensor is a three-dimensional tensor corresponding to a height, a width, and channels of the input image,
wherein the weighting matrix estimation layer inputs the feature tensor to estimate the weighting matrix indicating a weighting of each two-dimensional element corresponding to the height and the width of the input image, and
wherein the pooling layer calculates, for each channel of the input image, a weighted generalized mean of two-dimensional elements corresponding to the height and the width for the channel among three-dimensional elements of the feature tensor and an element of the weighting matrix and extracts the feature vector formed of a value calculated for each channel.

11. The image feature learning method of claim 10, further comprising:
generating a plurality of the first images and a plurality of the second images by converting, for each of a plurality of magnifications, the first image and the second image included in the training data to a size enlarged or reduced by using the magnification, wherein the image feature learning device learns parameters of each layer in the convolutional neural network such that:
a loss function value obtained by calculating,
  based on:
    a first integrated feature vector obtained by integrating a plurality of the first feature vectors obtained by applying each of a plurality of the first images generated by the size image generator to the convolutional neural network as the input image,
    a second integrated feature vector obtained by integrating a plurality of the second feature vectors obtained by applying each of a plurality of the second images generated by the size image generator to the convolutional neural network as the input image, and
    the label included in the training data,
  the loss function expressed by using a distance between the first integrated feature vector of the first image and the second integrated feature vector of the second image, which are relevant images, becomes smaller.

12. The image feature learning method of claim 8, further comprising:
generating a plurality of the first images and a plurality of the second images by converting, for each of a plurality of magnifications, the first image and the second image included in the training data to a size enlarged or reduced by using the magnification, wherein the image feature learning device learns parameters of each layer in the convolutional neural network such that:
a loss function value obtained by calculating,
  based on:
    a first integrated feature vector obtained by integrating a plurality of the first feature vectors obtained by applying each of a plurality of the first images generated by the size image generator to the convolutional neural network as the input image,
    a second integrated feature vector obtained by integrating a plurality of the second feature vectors obtained by applying each of a plurality of the second images generated by the size image generator to the convolutional neural network as the input image, and
    the label included in the training data,
  the loss function expressed by using a distance between the first integrated feature vector of the first image and the second integrated feature vector of the second image, which are relevant images, becomes smaller.

13. The image feature learning method of claim 8, further comprising:
receiving an input image; and
extracting a feature vector of the input image by using the learnt convolutional neural network.

14. The image feature learning method of claim 8, further comprising:
generating a plurality of the input images by converting, for each of a plurality of magnifications, the input image to a size enlarged or reduced by using the magnification,
extracting, for each of the plurality of the input images, a feature vector by using the convolutional neural network, and
setting a vector obtained by integrating feature vectors extracted for the plurality of the input images as a feature vector of the input image.

15. A computer-readable non-transitory recording medium storing a computer-executable program for image feature learning processing for learning a convolutional neural network for extracting a feature vector of an input image based on training data as a set of a first image, a second image, and a label indicating whether the first image and the second image are relevant images, the computer-executable program when executed by a processor causes a computer system to:
receive input of the training data, the convolutional neural network being configured by including:
a fully convolutional layer for performing convolution of the input image to output a feature tensor of the input image;
a weighting matrix estimation layer for estimating a weighting matrix indicating a weighting of each element of the feature tensor; and
a pooling layer for extracting a feature vector of the input image based on the feature tensor and the weighting matrix; and
learn parameters of each layer in the convolutional neural network such that a loss function value obtained by calculating,
based on:
a first feature vector obtained by applying the first image included in the training data to the convolutional neural network as the input image,
a second feature vector obtained by applying the second image included in the training data to the convolutional neural network as the input image, and
the label included in the training data,
a loss function expressed by using a distance between the first feature vector of the first image and the second feature vector of the second image, which are relevant images, becomes smaller.

16. The computer-readable non-transitory recording medium of claim 15, wherein the feature tensor is a three-dimensional tensor corresponding to a height, a width, and channels of the input image,
wherein the weighting matrix estimation layer inputs the feature tensor to estimate the weighting matrix indicating a weighting of each two-dimensional element corresponding to the height and the width of the input image, and
wherein the pooling layer calculates, for each channel of the input image, a weighted generalized mean of two-dimensional elements corresponding to the height and the width for the channel among three-dimensional elements of the feature tensor and an element of the weighting matrix and extracts the feature vector formed of a value calculated for each channel.

17. The computer-readable non-transitory recording medium of claim 16, the computer-executable program when executed by the processor further causes the computer system to:
generate a plurality of the first images and a plurality of the second images by converting, for each of a plurality of magnifications, the first image and the second image included in the training data to a size enlarged or reduced by using the magnification, wherein the image feature learning device learns parameters of each layer in the convolutional neural network such that:
a loss function value obtained by calculating,
based on:
a first integrated feature vector obtained by integrating a plurality of the first feature vectors obtained by applying each of a plurality of the first images generated by the size image generator to the convolutional neural network as the input image,
a second integrated feature vector obtained by integrating a plurality of the second feature vectors obtained by applying each of a plurality of the second images generated by the size image generator to the convolutional neural network as the input image, and
the label included in the training data,
the loss function expressed by using a distance between the first integrated feature vector of the first image and the second integrated feature vector of the second image, which are relevant images, becomes smaller.

18. The computer-readable non-transitory recording medium of claim 15, the computer-executable program when executed by the processor further causes the computer system to:
generate a plurality of the first images and a plurality of the second images by converting, for each of a plurality of magnifications, the first image and the second image included in the training data to a size enlarged or reduced by using the magnification, wherein the image feature learning device learns parameters of each layer in the convolutional neural network such that:
a loss function value obtained by calculating,
based on:
a first integrated feature vector obtained by integrating a plurality of the first feature vectors obtained by applying each of a plurality of the first images generated by the size image generator to the convolutional neural network as the input image,
a second integrated feature vector obtained by integrating a plurality of the second feature vectors obtained by applying each of a plurality of the second images generated by the size image generator to the convolutional neural network as the input image, and
the label included in the training data,
the loss function expressed by using a distance between the first integrated feature vector of the first image and the second integrated feature vector of the second image, which are relevant images, becomes smaller.

19. The computer-readable non-transitory recording medium of claim 15, the computer-executable program when executed by the processor further causes the computer system to:
receive an input image; and
extract a feature vector of the input image by using the convolutional neural network learned by the image feature learning device.

20. The computer-readable non-transitory recording medium of claim 15, the computer-executable program when executed by the processor further causes the computer system to:
generate a plurality of the input images by converting, for each of a plurality of magnifications, the input image to a size enlarged or reduced by using the magnification;
extract, for each of the plurality of the input images, a feature vector by using the convolutional neural network, and
set a vector obtained by integrating feature vectors extracted for the plurality of the input images as a feature vector of the input image.

* * * * *